(12) United States Patent
Izadpanah

(10) Patent No.: US 7,065,384 B2
(45) Date of Patent: Jun. 20, 2006

(54) NETWORKED AND FIELD ADDRESSABLE DISTRIBUTED ANTENNA SYSTEM

(75) Inventor: Hossein Izadpanah, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 628 days.

(21) Appl. No.: 09/934,742

(22) Filed: Aug. 21, 2001

(65) Prior Publication Data
US 2003/0050099 A1    Mar. 13, 2003

(51) Int. Cl.
H04M 1/00    (2006.01)

(52) U.S. Cl. .............. 455/562.1; 455/444; 455/500; 455/450

(58) Field of Classification Search ............ 455/562.1, 455/557, 561, 16, 24, 25, 500, 507, 446, 455/41.2, 20, 450, 449, 444
See application file for complete search history.

(56) References Cited

U.S. PATENT DOCUMENTS

| | | | |
|---|---|---|---|
| 4,230,999 A | | 10/1980 | Ahmed |
| 5,528,232 A | | 6/1996 | Verma et al. |
| 5,550,520 A | | 8/1996 | Kobayashi |
| 5,890,055 A | * | 3/1999 | Chu et al. ............... 455/16 |
| 6,381,473 B1 | * | 4/2002 | Niki ..................... 455/562.1 |
| 6,690,657 B1 | * | 2/2004 | Lau et al. ................. 370/315 |
| 6,771,933 B1 | * | 8/2004 | Eng et al. ................ 455/41.2 |
| 6,785,513 B1 | * | 8/2004 | Sivaprakasam ........... 455/63.1 |

OTHER PUBLICATIONS

Sanjal Kumar Das, Lucent Techn. (India) Ltd., "Amplitude-Frequency Shift Keying (AFSK)," Bangalore, India in BWAS, Conference digest pp. 237-240, Dec. 4, 2000, SF, CA, USA.

* cited by examiner

Primary Examiner—Joseph Feild
Assistant Examiner—Huy D. Nguyen
(74) Attorney, Agent, or Firm—Tope-McKay & Associates (57) ABSTRACT

The present invention provides a megacell 100, which is divided into a plurality of picocells 102. Each picocell 102 is serviced by a secondary base repeater node configured to transmit to any of three adjacent picocells 102. The base station 106 acts both as an originating information signal source and as an originating base station for transmitting a command signal. The command signal is a narrowband signal, which can be transmitted on a channel with sufficient range to reach the entire megacell. The information signal is a broadband signal with a short range picocell, which is transmitted from a secondary base repeater node to its adjacent neighbors.

34 Claims, 6 Drawing Sheets

NETWORKED AND FIELD ADDRESSABLE DISTRIBUTED ANTENNA SYSTEM

BACKGROUND (1) Technical Field

The present invention is related to the field of wireless RF or optical communications and information (data) networking. More specifically, the present invention provides an apparatus and a method for providing a networked and field addressable distributed antenna system for facilitating broadband wireless communications.

(2) Brief Discussion of Prior Art

As data processing continues to advance, the number and types of data processing applications are steadily increasing. In recent years, for example, it has become possible to use computer systems for the storage and playback of digital audio and video. Contemporaneously with increases in processing speed, computer networking has become extremely important for communicating between data processing applications. With ever-evolving communication networks such as the Internet and data delivery systems such as cable and satellite television, which provide users with rich information content, faster and faster inter-computer connections are required.

Presently, most high-speed connections in the range of megabit per second (Mbps) and up rely on either physical connections such as wires or fiber optic connections, or on point-to-point RF wireless connections with very limited range. A need presently exists for a wireless network which allows for coverage of a selective area inside of a larger megacell service area. The present invention proposes techniques and methods incorporating field distributed short-range repeater nodes that are networked in order to repeat a signal along a desired and dedicated path to a particular picocell within the megacell service area.

SUMMARY

The present invention provides techniques and methods incorporating field distributed short-range repeater nodes that are networked, in order to repeat a signal along a desired and dedicated path to a particular picocell within a megacell service area.

One embodiment of the present invention provides a networked and field addressable distributed antenna system comprising a large field megacell coverage area. A portion of the coverage area is partitioned into a plurality of short-range picocells. Each of the picocells is serviced by a secondary base repeater node, which is operative to receive an information signal from a neighboring secondary base repeater node or from an originating information signal source. In addition, each picocell receives a command signal, including a direction command from an originating base station having a command signal transmitter. Further, the picocells transmit the information signal in at least one of three directions for receipt by local users or for use by a neighboring secondary base repeater node, which is ideally, positioned along the direction to which the information signal was transmitted. The direction in which the information signal is transmitted is determined by the direction command of the command signal. The secondary base repeater nodes may be positioned such that they re-broadcast the information signal to neighboring secondary base repeater nodes in a tree structure.

In another embodiment the present invention provides a networked and field addressable distributed antenna system, wherein a networked and field addressable distributed antenna system is utilized. According to this embodiment, at least a portion of the secondary base repeater nodes are further configured to modify a received information signal and to re-transmit the received information signal as a modified information signal.

In yet another embodiment the present invention provides a networked, field addressable distributed antenna system. According to this embodiment, the secondary base repeater nodes further include a command signal receiver for receiving a command signal and an information receiving antenna for receiving the information signal from a neighboring, secondary base repeater node, or from an originating information signal source. Further, this embodiment of the invention provides an amplifier for receiving the information signal from the information-receiving antenna, wherein the antenna is configured to amplify the information signal. An information signal transmitter is provided and is configured to receive the amplified information signal from the amplifier and, in response to the command signal, the information signal transmitter transmits the information signal to at least one of three picocells. The direction in which the information signal is transmitted is determined by the direction command of the command signal.

Yet another embodiment of the present invention provides a secondary base repeater node for use within a networked, field addressable distributed antenna system. The secondary base repeater node includes a command signal receiving antenna, an information receiving antenna, an amplifying means connected with the information receiving antenna, a three-directional information signal transmitting antenna, a switch bank connected between the amplifying means and a three-directional information signal transmitting antenna. Wherein the transmitting antenna, in conjunction with the command signal receiver, is configured to receive the direction command from the command signal, and to selectively cause the three-directional information signal transmitting antenna to re-transmit the amplified information signal in at least one of thee directions based on the direction command.

Another embodiment of the present invention provides an originating base station, which operates within a networked and field addressable distributed antenna system. According to this embodiment, the originating base station comprises a code generating transmission unit including a direction code database. The database includes direction codes for each switch controlling the three-directional information signal transmitting antennas.

Additionally, the invention provides a processor for determining a signal path. This processor includes a plurality of secondary base repeater nodes, and a means for retrieving digital direction codes from the direction code database corresponding to switches controlling the three-directional information-signal transmitting antennas along the path. Further this embodiment of the invention provides modulator for receiving the digital direction codes from the processor and for using an amplitude-modulation scheme to modulate the digital direction codes onto a radio frequency channel, thus producing a command signal. This command signal is then transmitted to a plurality of secondary base repeater nodes.

Yet another embodiment of the present invention provides method for distributing information to selective picocells within a megacell by using a networked and field addressable distributed antenna system. According to this method, an information signal is received from an information source at a secondary base repeater node. Next, a command signal, including a direction command from a command signal transmitter, is received, and the protocol determines at least one direction which to re-transmit the received information signal, which originated with the secondary base repeater node. The signal is re-transmitting in at least one of three directions.

BRIEF DESCRIPTION OF THE DRAWINGS

These and other features, aspects, and advantages of the present invention will become better understood with regard to the following description, appended claims, and accompanying drawings where:

DETAILED DESCRIPTION

The present invention is related to the field of communications and data networking. More specifically, the present invention provides an apparatus and method for providing a networked and field addressable distributed antenna system for facilitating broadband wireless communications. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In order to provide a working frame of reference, first a glossary of terms used in the description and claims is given as a central resource for the reader. Then, a brief introduction is provided in the form of a narrative description of the present invention to give a conceptual understanding prior to developing the specific details.

Glossary

Before describing the specific details of the present invention, it is useful to provide a centralized location in which selected terms used herein and in the claims are defined. The terms defined herein are intended to assist the reader in gaining a feel for the words used herein, and not to imply their entire scope or absolute limitations to them as they apply to the invention described herein. The terms defined are as follows:

Antenna—An antenna is any mechanism for converting a wire (metal, fiber optic, etc.) based signal into a wireless signal (RF, laser, etc.).

Broadband—Broadband refers traditionally to signals of higher bit-rate and bandwidth than necessary for transmitting digitized voice signals (around 64 kilobits per second). Typically, broadband signal transmissions are used in short-range, line-of-sight architectures. Examples of RF channels that may be used in conjunction with the present invention for broadband communication include the 30, 40, 60, and 90 GHz millimeter wave bands as well as optical wireless and laser communication technologies.

Command Signal—A command signal, as used with the present invention, is a signal which controls switches at a secondary base repeater node in order to select the direction(s) in which an information signal received at the secondary base repeater node will be retransmitted. Preferably, the command signal is a multi-bit wide direction command transmitted by amplitude modulating and phase shifting command segments onto a radio frequency carrier channel at an originating base station for detection and reassembly in a register at each of the secondary base repeater nodes in the megacell. The multi-bit direction command provides a path setup through a plurality of secondary base repeater nodes to at least one desired picocell using a database of switching control codes for the three-directional information transmitting antennas of the secondary base repeater nodes.

Information Signal—The information signal is a data signal transmitted through the nodes in the megacell from secondary base repeater node to secondary base repeater node as a broadband signal. The information signal could, for example, comprise digitized audio, video, or text, or other type of information or may be an analog information signal.

Local—The term local indicates point-to-point communication between a user within a picocell and the secondary base repeater node servicing that picocell. More generally, local may also indicate a communication that takes place within a picocell (e.g., communication between neighboring secondary base repeater nodes may be considered local).

Megacell—A megacell is a large physical area serviced by a plurality of secondary base repeater nodes. The megacell may be any size and shape (typically many kilometers across) depending on the particular application, and is generally too large to be serviced by a single originating input end base or single secondary base repeater node. The megacell is divided into many side-by-side short range picocells, a desired portion of which may be serviced by setting up communication paths among the secondary base repeater nodes.

Narrowband—A narrowband channel is used for transmission of the command signal. The narrowband signal preferably has an effective communication range great enough to reach all of the secondary base repeater nodes in the megacell (megacell distribution). Narrowband channels are typically for low bit-rate communication (around 64 kilobits per second), and are effective for long-range line-of-sight and non-line-of-sight communications among distributed nodes. Typical examples of narrowband channels include cellular and personal communication systems (PCS) channels common in today's wireless communication systems.

Neighboring—The term neighboring is generally used to indicate communications occurring in a point-to-point fashion between adjacent cells, e.g., between secondary base repeater nodes across a picocell without the need for repeating the signal.

Picocell—Picocells are short range, small subdivisions of a megacell. Each picocell within a megacell in which service is desired is serviced by a secondary base repeater node. Picocells are generally in the neighborhood of 50 to 500 meters across, depending on the channel data rates used for broadband communications and the needs of a particular embodiment.

Tree Structure—A tree structure is a well-known geometric networking structure which begins at a root or origin and branches outward to terminate at leaf nodes. For purposes of the present invention, each node in the tree structure preferably has three sub-branches (e.g., each secondary base repeater node services the following three picocells, each with a receiving secondary base repeater node for receiving the information signal transmitted across the respective picocell from an originating secondary base repeater node). Depending on the needs of the particular embodiment, the tree structure of the secondary base repeater nodes (and hence, the picocells) within a megacell may be balanced or non-balanced (e.g., may have the same number of sub-branches at each node).

User—Users within the megacell are typically defined as data applications receiving and using the data contained in the broadband information signal.

Introduction

In general terms, the present invention provides a mechanism, technique, and method which uses networked and field addressable distributed antennas in order to provide broadband coverage in a megacell subdivided into a plurality of picocells. Secondary base repeater nodes are distributed throughout the megacell such that each secondary base repeater node can receive an information signal, which it can re-transmit in at least one of three directions. The information signal is transmitted on a broadband channel and propagates in a tree-like manner across the megacell. The direction(s) in which the information signal is transmitted from each secondary base repeater node is determined by a control signal transmitted from a control signal transmitter on a narrowband channel. In order to generate the control signal, a database is used, which stores control codes for switches that control the direction in which the information signal is transmitted from each secondary base repeater node. The control codes are used in order to guide an information signal along a desired path in the megacell so that it reaches a desired picocell.

DETAILS OF THE PRESENT INVENTION

The present invention provides a field addressable distributed antenna system for networked wireless communication systems, and suitable for many military and commercial broadband applications. Multiple directive and short-range distributed antennas are interconnected and networked using relay and repeater nodes.

Communication link and signal routing to a local picocell is established via matching digital switching codes, transmitted independently, along with an information signal to be routed. An information signal can be addressed to reach one or many of the "local" nodes in an array of multiple networked antennas. The nodes communicate in a tree topology of two or more short range cells (Pico-cells), each receiving the signal from a higher level (in the tree) and passing it (if instructed) to lower branches in the commanded direction or by the selected antenna beam. The networked base antenna system operates mainly in broadcast mode (mono and multicast) for area coverage, but can also operate in a bi-directional communications mode utilizing a loop back means. The proposed architecture is scalable and can be implemented in one or more of the RF, microwave, and millimeter wave bands, as well as in the optical wireless and laser communication domain with equal and common functionality.

Figure 1:
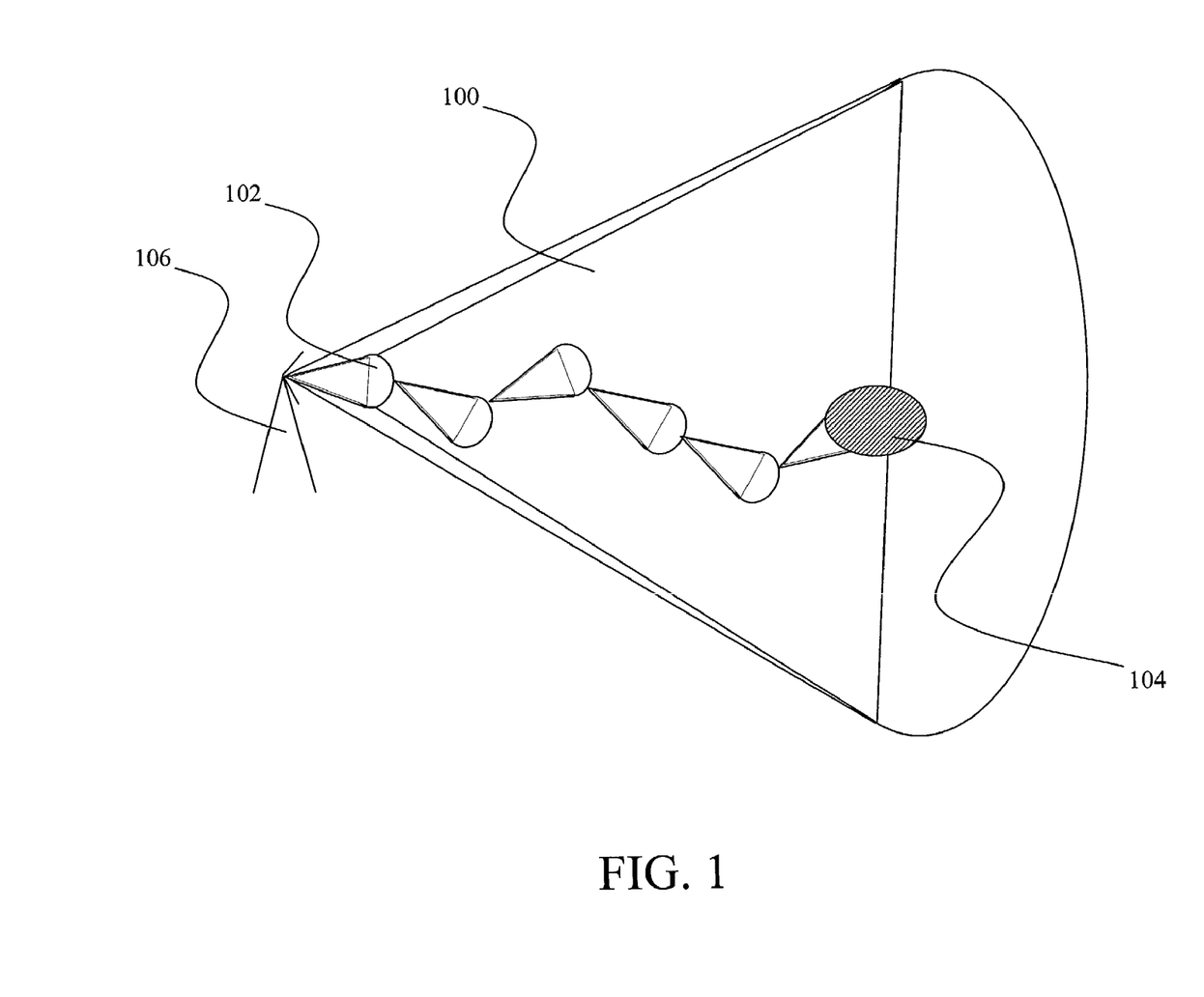
FIG. 1 is an illustrative diagram depicting a path through a megacell via a plurality of picocells.

An illustrative diagram depicting a path through a megacell is presented in FIG. 1. A megacell 100 is divided into a plurality of picocells 102. Although not shown, the whole megacell 100 may be divided into multiple picocells 102. Only the picocells used for transmission of an information signal to a desired target picocell 104 are shown.

Generally, each picocell 102 is serviced by a secondary base repeater node (not shown in FIG. 1) configured to transmit to any of three adjacent picocells 102. The fact that the picocells 102 are angled with respect to the central transmission direction of a base station 106 is indicative of the fact that in the case shown in FIG. 1, at each secondary base repeater node, one or a combination of the three possible transmission directions are used for the re-transmission of the information signal. The base station 106 in this case acts both as an originating information signal source and as an originating base station for transmitting a command signal. The command signal is a narrowband signal which can be transmitted on a channel with a great enough range to reach the entire megacell. The information signal is a high speed (high bit-rate/broadband) signal with a short range picocell, which is transmitted from a secondary base repeater node to its adjacent neighbors.

Figure 2:
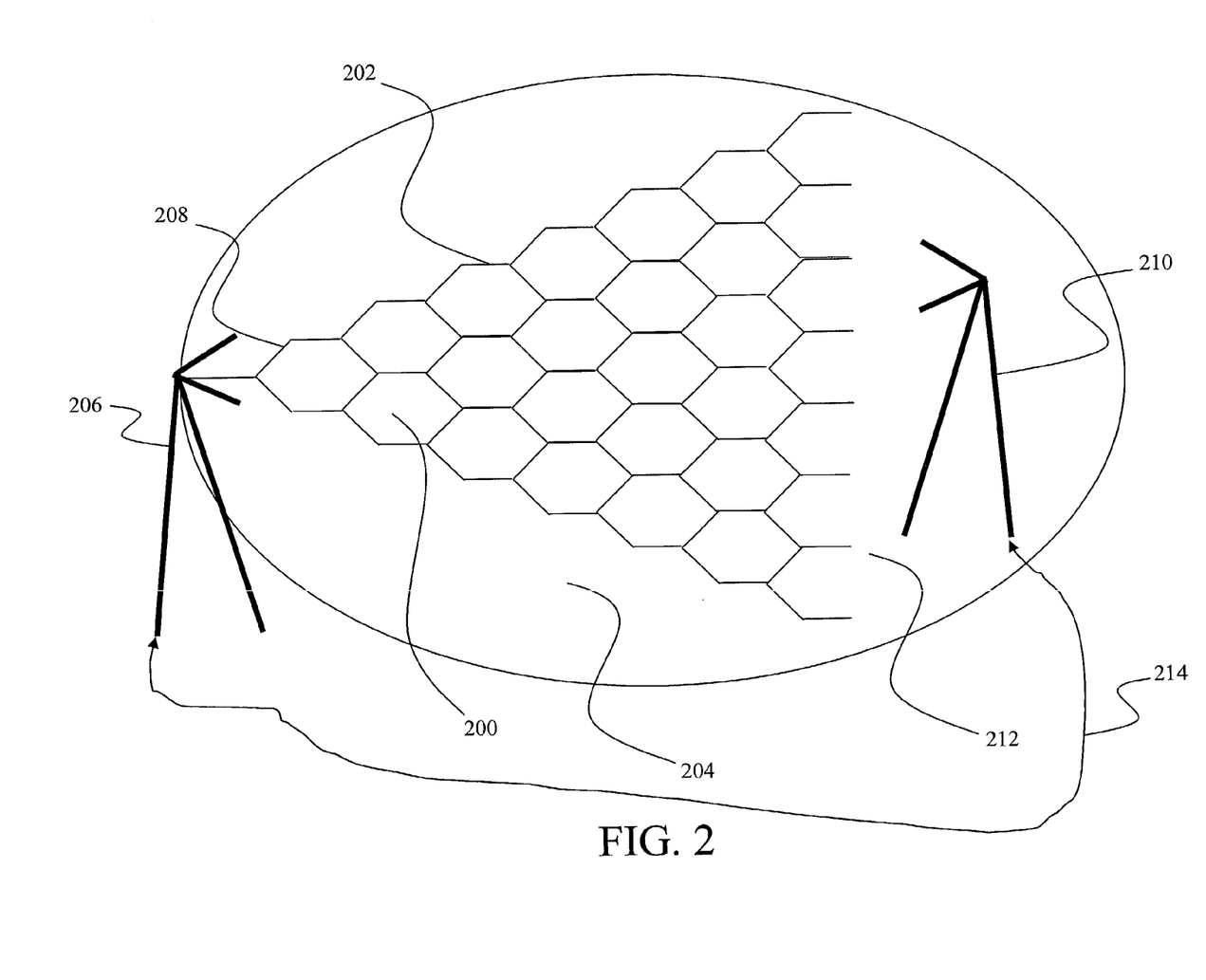
FIG. 2 is an illustrative diagram depicting a fan-out tree structure embodiment, along with an information signal output end receiver and a loop back means.

Another embodiment of the present invention is presented in FIG. 2, wherein a fan-out tree structure is depicted, along with an information signal output end receiver and a loop back means. The fan-out tree structure 200 is shown as a plurality of potential paths 202 through the megacell 204. A base station 206 is positioned at an input end 208 of the fan-out tree structure 200, and an information signal output end receiver 210 is positioned at an output end 212 of the fan-out tree structure 200. The information signal output end receiver 210 is designed and positioned such that it is capable of receiving the information signal from all of the secondary base repeater nodes at the output end 212 of the fan-out tree structure. Additionally, a loop back means 214 is provided connecting the information signal output end receiver 210 with the base station 206 in order to loop back the information signal. The information signal output end receiver 210 may be a single antenna or a plurality of antennas. The loop back means 214 may be a wired connection (metal wire or fiber-optic cable), or it may be a point-to-point RF and optical wireless signal such as a laser (a free-space optical wireless connection) or millimeter-wave RF broadband connection.

Using the configuration depicted in FIG. 2, it is possible for a user within one picocell to communicate with a user in another picocell via the loop back means 214. A database of all control codes for controlling the direction of transmission of the information signal from each secondary base repeater node is used to generate routes for the information signal through the plurality of secondary base repeater nodes;. Additionally, the information signal may be modified as it is re-transmitted through the plurality of secondary base repeater nodes, typically to inform the base station 206 of the current location of each user within the megacell. Using a lookup table along with the proper command codes from the database, it is possible to route a call from one user to another user in the megacell using the loop back means 214 for communication to create a ring-like structure. Thus calls may be set up and routed through the plurality of secondary base repeater nodes in the megacell. The information signal may also include a portion set aside specifically for call routing and other information included by modification or supplementation at the secondary base repeater nodes. In order to set up calls, the secondary base repeater nodes may be configured to receive and re-transmit call setup requests from users local to the secondary base repeater nodes. The call setup requests typically include an identity of a target user (which may be in the form of a code such as a telephone number), with the identity being used for mapping the identity of the target user to a picocell within the megacell, and for providing information necessary for generating a direction command for a command signal to cause the call to be established along a predetermined path through the megacell 204 and the loop back means 214. Thus, a user may set up a call to transmit information to another user within the megacell 204.

In addition to being used for setting up calls, the loop back means 214 may also be used for testing paths and diagnosing problems within the network. For example, occasionally, an information signal can be directed through every path in the network in order to ensure that the information signal is properly received back at the base station 206. In this way, the integrity of each connection within the network may be tested for diagnosis.

Figure 3:
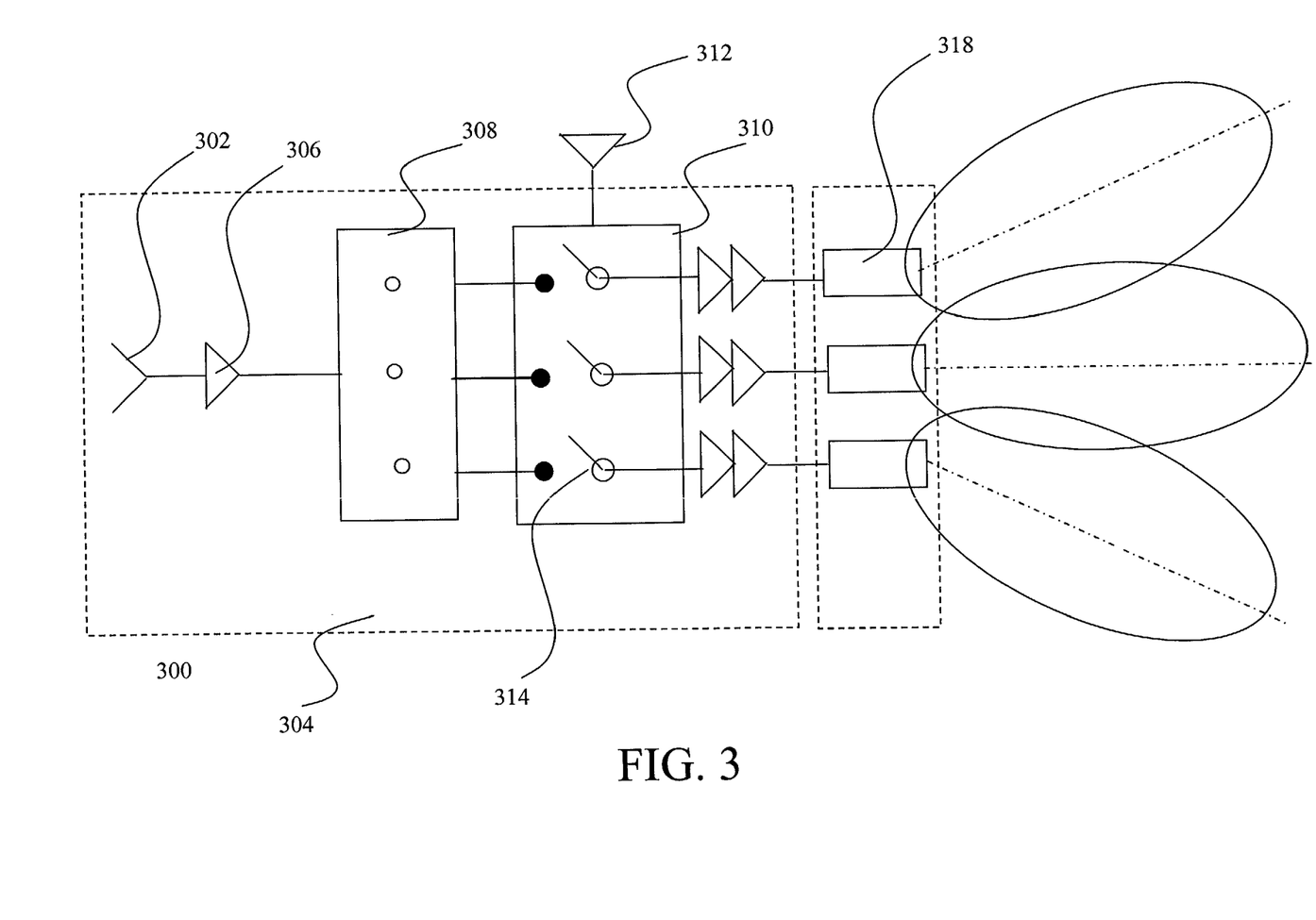
FIG. 3 is a block diagram depicting the components of a secondary base repeater node.

A more detailed view of the components of a secondary base repeater node is depicted in FIG. 3. Each secondary base repeater node 300 includes an information signal receiving antenna 302 for receiving an information signal from an information signal source or from another secondary base repeater node 300. The information signal receiving antenna 302 may be configured to receive in any broadband channel suitable for the particular embodiment. An amplifying means 304 is connected with the information signal receiving antenna 302 for receiving the information signal and for amplifying the signal for re-transmission. Note that the secondary base repeater nodes 300 are preferably positioned near the edge of (and within) the coverage range of the secondary repeater node 300 from which it receives (near the edge of the picocell). This facilitates the most efficient use of the secondary base repeater nodes 300 for area coverage. In greater detail, the amplifying means 304 may be a multistage amplifying system comprising a common amplifier 306 for initially amplifying the information signal before it is split in a three-way splitter 308. After the information signal has been split, it is passed to a switch bank 310, typically in the form of three independently addressable switches controlled by a signal from the control signal receiver 312. Assuming a particular switch 314 in the switch bank 310 is activated by the control signal, the information signal is passed through the switch 314 and is then amplified by a branch amplifier 316 in preparation for transmission by the three-directional information signal transmitting antenna 318 in at least one of three directions, if the node is commanded to be part of a path setup. Note that the branch amplifiers 316 are positioned after the switch 314 in order to conserve power so that the amplifier and information signal portions not intended for transmission are not activated and amplified.

The three-directional information signal transmitting antenna 318 is preferably in the form of either a sector antenna or a multi-beam forming antenna array in the RF or optical domain, but can be of any form useful for a particular embodiment. Further, the three-directional information signal transmitting antenna 318 is preferably operative to transmit in at least one of three approximately 60 degree sectors such that the 60 degree sectors slightly overlap and add up to provide a 180 degree angular coverage region substantially opposite the information receiving antenna 302. Greater detail as to the control of the switch bank 310 will now be presented.

The command signal is preferably transmitted in the form of an amplitude-modulated frequency shift keyed (A-FSK) signal including digital binary (two-bit) format direction command segments, the aggregate of which are collected in a register for assembling a direction command to match the node switching codes for directing the three-directional information signal transmitting antenna 318. In order to generate a command signal, the system first looks up the switching control codes for the switches 314 of the secondary base repeater nodes 300 along a desired path through the megacell. The selected switching control codes are then used to generate a command signal, which is transmitted two bits at a time in command segments using an amplitude-modulated frequency shift keying scheme. The command signal code bits are then received, two bits at a time, and are re-assembled in a register at the secondary base repeater nodes 300. A switch processor is then used at each secondary base repeater node 300 to compare the command signal with the command codes for the on-board switches 314 in order to determine whether to re-transmit the information signal. By using an amplitude-modulated frequency shift keying technique, only signal envelope detection is required, eliminating the need for RF mixing and filtering circuitry.

Figure 4:
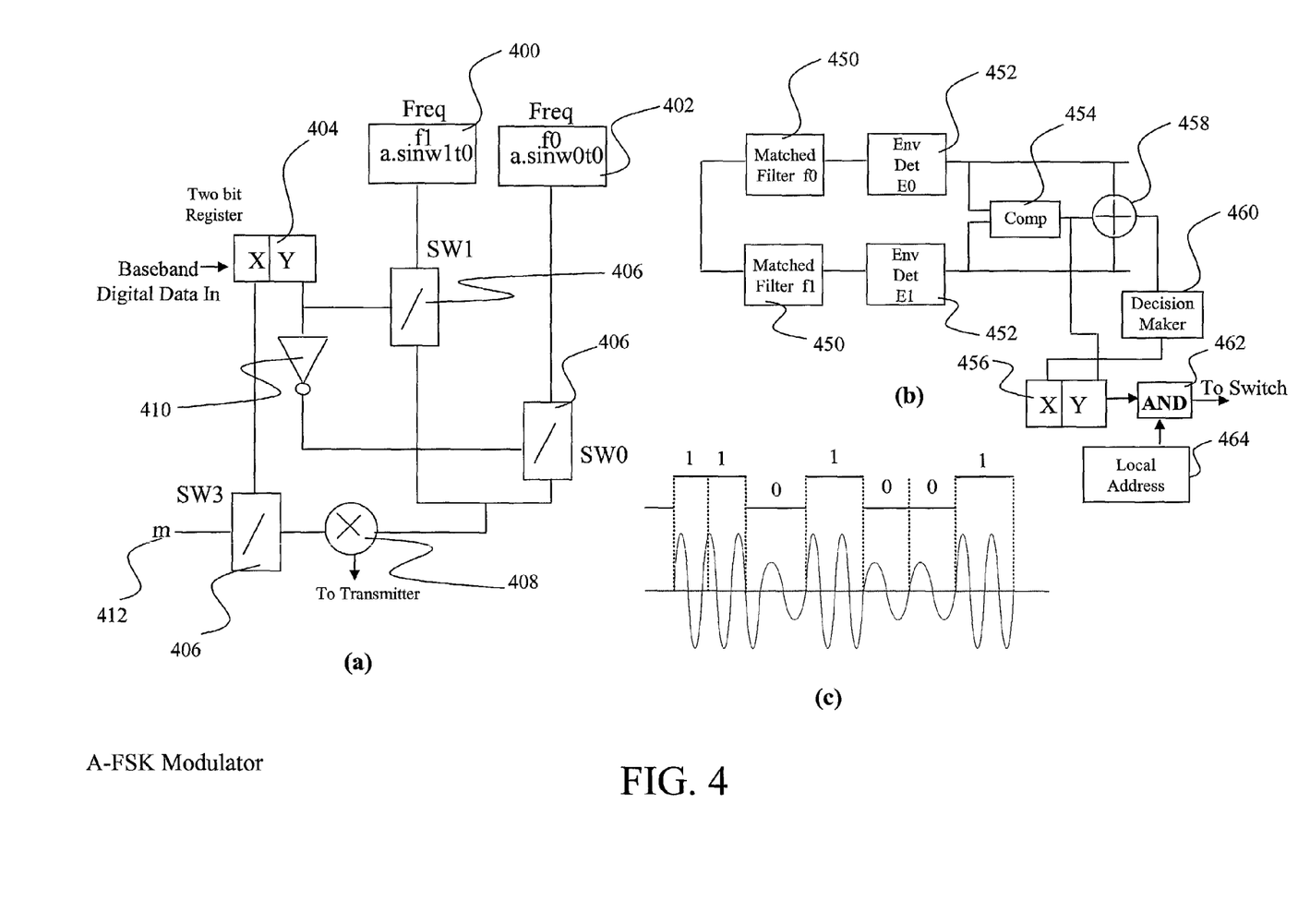
FIG. 4(a) is a block diagram depicting the architecture of an amplitude-modulated frequency shift keying modulator for transmitting a multi-bit wide command signal in digital binary segments.
FIG. 4(b) is a block diagram depicting the architecture of an amplitude-modulated frequency shift keying demodulator for receiving and detecting a multi-bit wide command signal in digital binary segments.
FIG. 4(c) is a waveform diagram depicting a typical amplitude-modulated frequency shift keyed signal.

A block diagram of an A-FSK modulator is depicted in FIG. 4(a) for greater clarity. Sinusoidal waves of two frequencies, f1 400 and f2 402 are used in conjunction with a two bit register 404, three switches 406, a multiplier 408, an inverter 410, and a multiplier factor 412 in order to generate an amplitude modulated frequency shift keyed signal as depicted in FIG. 4(c).

A block diagram of an A-F SK demodulator is depicted in FIG. 4(b) for greater clarity. The A-FSK demodulator receives input from the command signal receiving antenna and uses frequency filters 450 to separate the signal into two frequencies, f1 and f2. Envelope detectors 452 are then applied to the signal in order to detect the amplitude of the command signal. A comparator 454 is used to determine which bit of a two-bit register 456 to set first (in the Y position). A summer 458 and a decision maker 460 are used to determine which bit to set next (in the X position). After the bits in the register have been set, they are ANDed in an AND gate 462 with the control codes 464 for the three-directional information signal transmitter in order to determine in which direction (if any) to re-transmit the information signal.

Note, once again, that by using the A-FSK modulator and demodulator as depicted in FIG. 4(a) and FIG. 4(b), respectively to provide switch processing, a digital wireless signal may be detected in a digital format without the need for local oscillator mixing and radio frequency processing. Further note that A-FSK is a well-known technique, so detailed discussion of A-FSK is intentionally limited herein. Further information on A-FSK techniques is available in "Amplitude-Frequency Shift Keying (AFSK)" by Sanjal Kumar Das of Lucent Technologies (India), Ltd., Bangalore, India in BWAS, conference digest pp. 237–240, 4 Dec. 2000, San Francisco, Calif., USA, wholly incorporated herein by reference.

Figure 5:
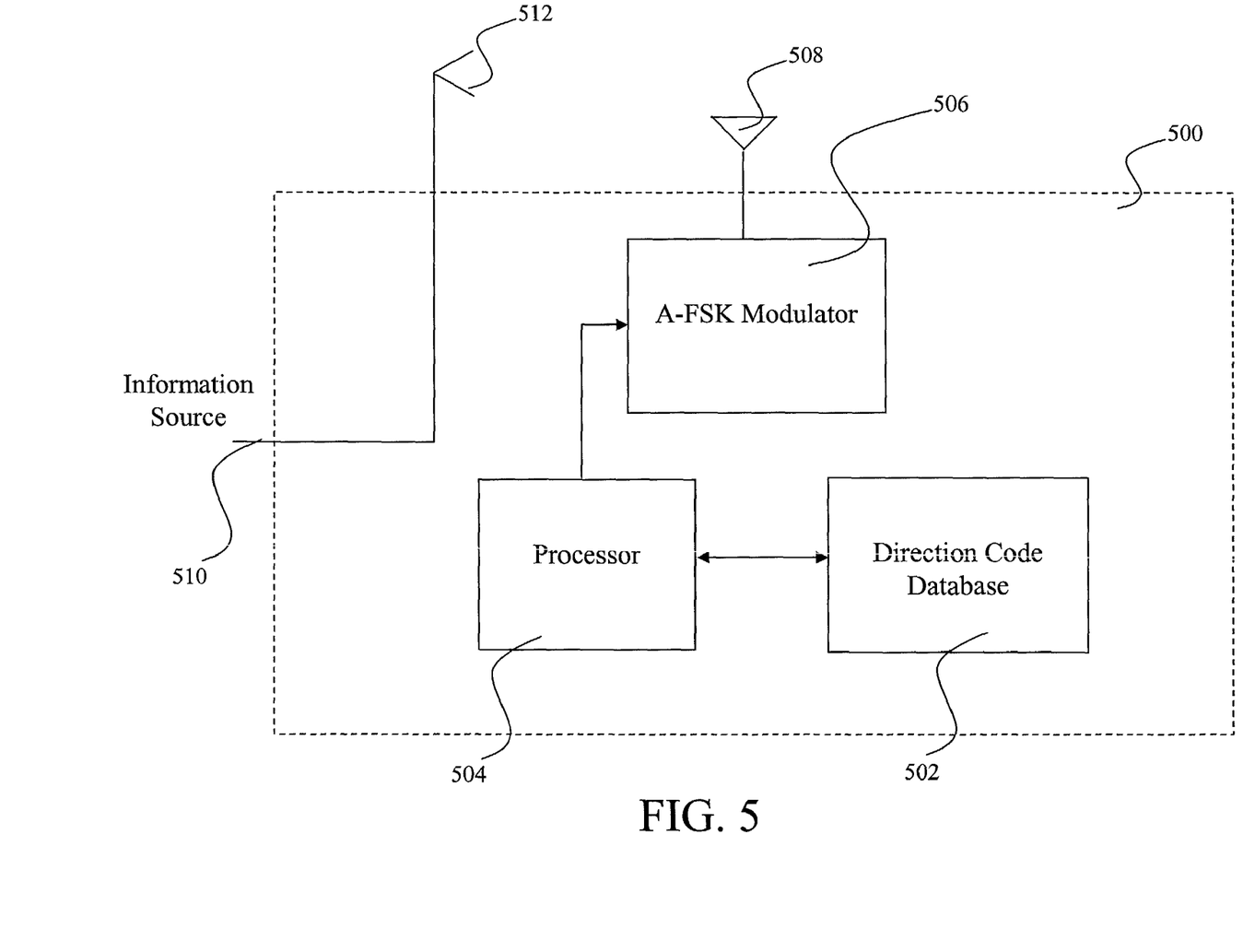
FIG. 5 is a block diagram depicting the architecture of a typical originating base station.

A block diagram depicting the functional components of an originating base station is depicted in FIG. 5. As shown, the originating base station 500 includes a code generating transmission unit including a direction code database 502, which stores direction codes for each one of the plurality of switches controlling three-directional information signal transmitting antennas within the plurality of secondary base repeater nodes. The codes stored in the direction code database 502 are retrieved and used by a processor 504 in order to cause the secondary base repeater nodes to transmit the information signal along a desired path through the megacell. A modulator 506 is included for receiving the digital direction codes and modulating them onto a radio frequency channel to produce a command signal. Preferably, the modulator 506 uses an amplitude-modulated frequency shift keying scheme. After modulation, the command signal is transmitted across the megacell by a command signal transmitter 508. As shown, the originating base station 500 also includes an information input 510 for receiving information from an information source. The information from the information input 510 is transmitted across a picocell to a secondary base repeater node by an information source transmitter 512. The information source transmitter 512 operates using a broadband channel, and the command signal transmitter 508 operates using a narrowband channel.

In another embodiment, the present invention comprises a method for distributing information to selective picocells within a megacell by using a networked and field addressable distributed antenna system. A block diagram outlining the steps of the method of the present invention is provided in FIG. 6. An information signal is received at a secondary base repeater node from an information source (possibly an originating base station) in an information signal receiving step 600. A command signal is also received, including a direction command, from a command signal transmitter in a command signal receiving step 602. The command signal is then used to determine at least one direction in which to re-transmit the received information signal from the secondary base repeater node in direction determining step 604. Once the transmission direction(s) have been determined, the information signal is re-transmitted in at least one of three directions as determined in the direction determining step 604 in an information signal re-transmitting step 606. In this manner, the information signal may be propagated through the plurality of secondary base repeater nodes in the megacell.

Figure 6:
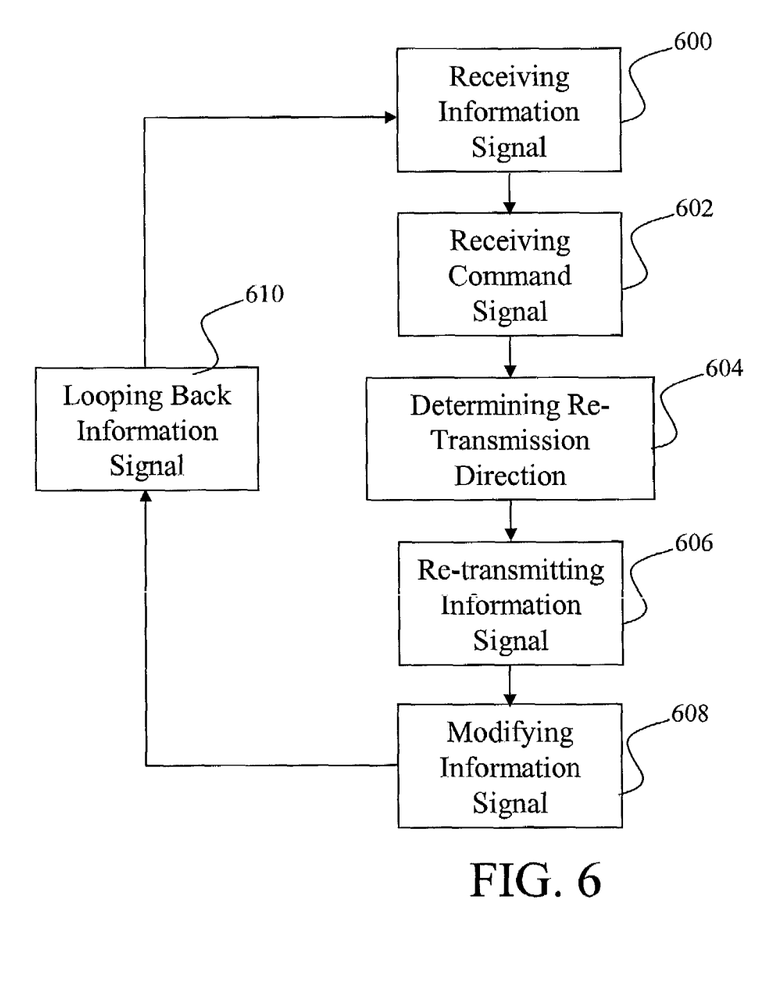
FIG. 6 is a flow diagram depicting the steps in the method of the present invention.

An optional step (not shown) of configuring the secondary base repeater nodes may be provided to enable the nodes to re-broadcast the information signal in a fan-out tree structure. Furthermore, the secondary base repeater nodes may be positioned such that only desired picocells within the megacell are capable of receiving the information signal. Also, as discussed relative to the antenna system previously, the megacell may have a designated input end and an output end, and the method may further comprise the step of looping back the information signal 610 from the output end to the input end. The looping back step 610 may be supplemented by providing an optional and additional step of modifying the received information signal 608 at each secondary base repeater node prior to the information signal re-transmitting step 606. Further, the looping back step 610 provides the groundwork for the additional step of setting up a call between users in the megacell, and may also be used as the basis for providing a step of using the looping back of the information signal for diagnostically ensuring correct path setup and for checking connection integrity within the megacell.

Thus, the present invention provides a means for selectively illuminating areas of a megacell with an information signal on a broadband channel. The present invention is easily scalable, as secondary base repeater nodes may be added or subtracted, and the database of codes may be modified, to alter the coverage area in order avoid useless or undesired illumination of particular areas (e.g., areas that are unpopulated with users). Although the individual secondary base repeater nodes typically communicate the information signal in a line-of-sight transmission medium, in aggregate, they can provide for non-line-of-sight communication with respect to the originating information source by allowing the information signal to "hop" around obstacles.

What is claimed is:

1. A networked and field addressable distributed antenna system comprising a large field megacell coverage area, at least a portion of which is partitioned into a plurality of short range picocells, wherein each of the picocells is serviced by a secondary base repeater node operative to receive an information signal from a neighboring secondary base repeater node or from an originating information signal source, and to receive a command signal including a direction command from an originating base station having a command signal transmitter, and to transmit the information signal in at least one of three directions for receipt by local users or by a neighboring secondary base repeater node positioned along the direction to which the information signal was transmitted, the direction in which the information signal is transmitted being determined by the direction command of the command signal, wherein the secondary base repeater nodes are positioned such that they re-broadcast the information signal to neighboring secondary base repeater nodes in a tree structure.

2. A networked and field addressable distributed antenna system as set forth in claim 1, wherein the secondary base repeater nodes are positioned such that they re-broadcast the information signal in a fan-out tree structure.

3. A networked and field addressable distributed antenna system as set forth in claim 2, wherein the megacell has an input end and an output end, and wherein the information signal may be propagated from secondary base repeater node to secondary base repeater node from an information signal source at the input end to an information signal output end receiver at the output end, with the information signal output end receiver configured to receive from a plurality of base repeater nodes at the output end of the megacell.

4. A networked and field addressable distributed antenna system as set forth in claim 3, wherein at least a portion of the secondary base repeater nodes are further configured to modify the received information signal and to re-transmit the received information signal as a modified information signal.

5. A networked and field addressable distributed antenna system as set forth in claim 3, wherein the information signal output end receiver is connected with the information source by a loop back means.

6. A networked and field addressable distributed antenna system as set forth in claim 5, wherein the loop back means is selected from the group consisting of a fiber-optic cable, a wire, and a point-to-point wireless channel.

7. A networked and field addressable distributed antenna system as set forth in claim 6, wherein at least a portion of the secondary base repeater nodes are further configured to modify the received information signal and to re-transmit the received information signal as a modified information signal.

8. A networked and field addressable distributed antenna system as set forth in claim 7, wherein the information signal contains a call setup portion and wherein at least a portion of the secondary base repeater nodes further configured with a means for receiving a call setup request from a local user including an identity of at least one second local user in the megacell, and wherein the networked and field addressable distributed antenna system further comprises a means for mapping the identity of a local user to a picocell within the megacell and providing information for generating a direction command of a command signal such that the direction command causes a call to be established along a predetermined path through the megacell and the loop back means from the local user to the at least one second local user, whereby a user may transmit information to at least one other desired user within the megacell.

9. A networked and field addressable distributed antenna system as set forth in claim 1, wherein the direction command from the command signal includes a direction command for a plurality of secondary base repeater nodes in order to cause the secondary base repeater nodes to transmit the information signal along a predetermined path through the megacell.

10. A networked and field addressable distributed antenna system as set forth in claim 1, wherein the secondary base repeater nodes further comprise a command signal receiver for receiving a command signal and an information receiving antenna for receiving the information signal from a neighboring secondary base repeater node or from an originating information signal source, an amplifier for receiving the information signal from the information receiving antenna, operative for amplifying the information signal, and an information signal transmitter for receiving the amplified information signal from the amplifier and operative in response to the command signal to transmit the information signal in a direction to at least one of three picocells for receipt by local users or by the next neighboring secondary base repeater node receiving from each picocell to which the information signal was transmitted, the direction in which the information signal is transmitted being determined by the direction command of the command signal.

11. A networked and field addressable distributed antenna system as set forth in claim 10, secondary base repeater nodes are positioned only in a desired area of coverage within the megacell such that only specified picocells representing the desired area of coverage within the megacell may receive coverage by the information signal.

12. A networked and field addressable distributed antenna system as set forth in claim 10, wherein the information signal transmitters of the secondary base repeater nodes are selected from the group consisting of sector antennas and multi-beam forming antenna arrays.

13. A networked and field addressable distributed antenna system as set forth in claim 12, wherein the information signal transmitters of the secondary base repeater nodes are operative to transmit in at least one of three approximately 60 degree sectors, with the combined three sectors aligned to transmit over a 180 degree angular coverage region substantially opposite the information receiving antenna of the respective secondary base repeater node.

14. A networked and field addressable distributed antenna system as set forth in claim 10, wherein each picocell is coincident with a coverage range of the servicing secondary base node, with the coverage range of the associated secondary base node including an edge, and wherein a neighboring secondary base node is positioned within the coverage range of the associated secondary base node and near the edge of the coverage range of the associated secondary base node.

15. A networked and field addressable distributed antenna system as set forth in claim 14, wherein the information signal transmitters of the secondary base repeater nodes are selected from the group consisting of sector antennas and multi-beam forming antenna arrays.

16. A networked and field addressable distributed antenna system as set forth in claim 15, wherein the information signal transmitters of the secondary base repeater nodes are operative to transmit in at least one of three approximately 60 degree sectors, with the combined three sectors aligned to transmit over a 180 degree angular coverage region substantially opposite the information receiving antenna of the respective secondary base repeater node.

17. A networked and field addressable distributed antenna system as set forth in claim 16, secondary base repeater nodes are selectively positioned within the megacell such that specified picocells within the megacell may receive coverage by the information signal.

18. A networked and field addressable distributed antenna system as set forth in claim 16, wherein the secondary base repeater nodes are positioned such that they communicate in a fan-out tree structure.

19. A networked and field addressable distributed antenna system as set forth in claim 18, wherein the megacell has an input end and an output end, and wherein the information signal may be propagated from secondary base repeater node to secondary base repeater node from an information signal source at the input end to an information signal output end receiver at the output end, with the information signal output end receiver configured to receive from a plurality of base repeater nodes at the output end of the megacell.

20. A networked and field addressable distributed antenna system as set forth in claim 19, wherein at least a portion of the secondary base repeater nodes are further configured to modify the received information signal and to re-transmit the received information signal as a modified information signal.

21. A networked and field addressable distributed antenna system as set forth in claim 19, wherein the information signal output end receiver is connected with the information source by a loop back means.

22. A networked and field addressable distributed antenna system as set forth in claim 21, wherein the loop back means is selected from the group consisting of a fiber-optic cable, a wire, and a point-to-point wireless channel.

23. A networked and field addressable distributed antenna system as set forth in claim 22, wherein at least a portion of the secondary base repeater nodes are further configured to modify the received information signal and to re-transmit the received information signal as a modified information signal.

24. A networked and field addressable distributed antenna system as set forth in claim 23, wherein the information signal contains a call setup portion and wherein at least a portion of the secondary base repeater nodes further configured with a means for receiving a call setup request from a local user including an identity of at least one second local user in the megacell, and wherein the networked and field addressable distributed antenna system further comprises a means for mapping the identity of a local user to a picocell within the megacell and providing information for generating a direction command of a command signal such that the direction command causes a call to be established along a predetermined path through the megacell and the loop back means from the local user to the at least one second local user, whereby a user may transmit information at least one other desired user within the megacell.

25. A networked and field addressable distributed antenna system as set forth in claim 24, wherein the information signal uses a broadband, picocell transmission channel and command signal uses a narrowband, megacell distribution channel.

26. A networked and field addressable distributed antenna system as set forth in claim 25, wherein the loop back means is used diagnostically to ensure correct path setup and to check connection integrity within the megacell.

27. A method for distributing information to selective picocells within a megacell by using a networked and field addressable distributed antenna system comprising the steps of:
   a. receiving an information signal from an information source at a secondary base repeater node;
   b. receiving a command signal including a direction command from a command signal transmitter;
   c. determining at least one direction in which to re-transmit the received information signal from the secondary base repeater node;
   d. re-transmitting the received information signal in at least one of three directions as determined in the determining step (c) for receipt by local users or by a neighboring secondary base repeater node positioned in the direction to which the information signal was transmitted, whereby the information signal may be re-broadcast through a plurality of secondary base repeater nodes in a tree structure.

28. A method for distributing information to selective picocells within a megacell by using a networked and field addressable distributed antenna system as set forth in claim 27, further comprising the step of configuring the base repeater nodes such that they re-broadcast the information signal in a fan-out tree structure.

29. A method for distributing information to selective picocells within a megacell by using a networked and field addressable distributed antenna system, as set forth in claim 28, further comprising the step of selectively positioning the base repeater nodes such that only desired picocells within the megacell are capable of receiving the information signal.

30. A method for distributing information to selective picocells within a megacell by using a networked and field addressable distributed antenna system as set forth in claim 29, wherein the megacell has an input end and an output end, and wherein the method further comprises the step of looping back the information signal from the output end to the input end.

31. A method for distributing information to selective picocells within a megacell by using a networked and field addressable distributed antenna system as set forth in claim 30, further comprising the step of optionally modifying the received information signal at each secondary base repeater node prior the re-transmitting step (d).

32. A method for distributing information to selective picocells within a megacell by using a networked and field addressable distributed antenna system as set forth in claim 31, further comprising the step of performing a call setup between users in the megacell.

33. A method for distributing information to selective picocells within a megacell by using a networked and field addressable distributed antenna system as set forth in claim 32, further comprising the step of using the looping back of the information signal for diagnostically ensuring correct path setup and for checking the path setup connection integrity within the megacell.

34. A method for distributing information to selective picocells within a megacell by using a networked and field addressable distributed antenna system as set forth in claim 30, further comprising the step of using the looping back of the information signal for diagnostically ensuring correct path setup and for checking the path setup connection integrity within the megacell.

* * * * *